United States Patent
Kim et al.

(12)

(10) Patent No.: US 9,711,929 B1
(45) Date of Patent: Jul. 18, 2017

(54) OPTICAL AMPLIFIER AND METHOD OF MANUFACTURING OPTICAL AMPLIFIER

(71) Applicant: LiComm Co., Ltd., Yongin-si (KR)

(72) Inventors: Sung Jun Kim, Suwon-si (KR); Jeong Mee Kim, Suwon-si (KR); Soo Young Yoon, Yongin-si (KR); Jung Kwon Lee, Suwon-si (KR)

(73) Assignee: LiComm Co., Ltd., Yongin-si (KR)

( * ) Notice: Subject to any disclaimer, the term of this patent is extended or adjusted under 35 U.S.C. 154(b) by 0 days.

(21) Appl. No.: 15/358,869

(22) Filed: Nov. 22, 2016

(51) Int. Cl.
*H01S 3/067* (2006.01)
*G02B 6/42* (2006.01)
*H01S 3/00* (2006.01)
*H01S 3/094* (2006.01)

(52) U.S. Cl.
CPC ........ *H01S 3/06704* (2013.01); *G02B 6/4215* (2013.01); *G02B 6/4246* (2013.01); *G02B 6/4262* (2013.01); *G02B 6/4286* (2013.01); *H01S 3/0064* (2013.01); *H01S 3/06754* (2013.01); *H01S 3/094003* (2013.01)

(58) Field of Classification Search
CPC . H01S 3/06704; G02B 6/4215; G02B 6/4246; G02B 6/4262; G02B 6/4286
See application file for complete search history.

(56) References Cited

U.S. PATENT DOCUMENTS

| 5,898,812 | A | * | 4/1999 | Vanoli | H01S 3/06704 385/135 |
| 5,915,061 | A | * | 6/1999 | Vanoli | H01S 3/06704 385/135 |
| 5,920,668 | A | * | 7/1999 | Uehara | H01S 3/06704 372/6 |
| 6,483,978 | B1 | * | 11/2002 | Gao | H01S 3/06704 359/341.1 |
| 2016/0103286 | A1 | * | 4/2016 | Matsui | G02B 6/3812 398/139 |

OTHER PUBLICATIONS

CFP Multi-Source Agreement CFP2 Hardware Specification, Draft Revision 0.3, May 2, 2013.*

* cited by examiner

*Primary Examiner* — Eric Bolda
(74) *Attorney, Agent, or Firm* — Antonio Ha & U.S. Patent, LLC (57) ABSTRACT

An apparatus comprising a case, an optical amplifier, and an optical transceiver is provided. The optical amplifier and the optical transceiver are included in the case. The case includes a top portion and a bottom portion. The top portion includes first to third sections arranged in a direction perpendicular to a direction extending from the top portion to the bottom portion. The first section has a larger area than the third section and the second section divides the first and third sections. The third section includes a first cavity including at least one portion of the optical amplifier. The optical amplifier is provided using at least one of an amplifying fiber, a pumping light source, an isolator, a wavelength-division multiplexer (WDM) coupler, a wavelength-variable optical filter, a monitoring-tap photo diode, and a driving control unit.

18 Claims, 6 Drawing Sheets

OPTICAL AMPLIFIER AND METHOD OF MANUFACTURING OPTICAL AMPLIFIER

CROSS-REFERENCE TO RELATED APPLICATION

This application claims priority under 35 U.S.C. §119 from Korean Patent Application No. 10-2016-0099351, filed on Aug. 4, 2016, in the Korean Intellectual Property Office (KIPO), the disclosure of which is incorporated by reference herein in its entirety.

TECHNICAL FIELD

The present Invention relates to an optical amplifier, and more particularly to, an optical amplifier that can be mounted in a standardized optical transceiver case.

DISCUSSION OF THE RELATED ART

Due to spread and increase of the Internet and data service, demands for broadband communication networks have been increased and thus, a bandwidth required in an optical communication technology has been increasing. Thus, a technology Innovation for realizing an ultra-broadband era beyond the broadband era has been strongly demanded.

Data rates of broadband transmission networks for transferring the broadband signals have been developed, e.g., from 2.5 Gbps to 10 Gbps, in the past decade. On the other hand, as a need of a ultra-fast Ethernet increases, the IEEE has completed standardizations for 40 Gbps and 100 Gbps Ethernets in 2010 and the ITU-T has provided recommendations for 40 Gbps and 100 Gbps optical terminal network (OTN) that are capable of transmitting the 40 Gbps and 100 Gpbs Ethernet signal traffics.

Such bandwidth-increasing-trend has required developments of optical transceivers that are capable of transmitting the 40 Gbps and 100 Gbps data rates. An optical data transmission network has played an important role in transferring broadband traffics from a data center to a user terminal. With spread of clouding services and data services at mobile devices, demands for optical transmission networks with an ultra-broadband have been Increased. In particular, replacements of existing low-speed optical transceivers by the 40 Gbps/100 Gbps optical transceivers may continuously be made for realizing large-capacity and high-speed data center and Ethernet/optical back-bone network with the large-capacity or high-speed.

To facilitate the broadband transmission, many optical transceivers are needed and there is a trend of miniaturizing the optical transceivers to mount such the many optical transceivers. Also, the optical transceivers and a case for mounting the optical transceivers are maintained by specific standardization since there may be no compatibility therebetween if they are manufactured separately by various service providers.

For example, a C form-factor pluggable (CFP) has been developed as a standard. The CFP may include CFP2 and CFP4. More particularly, the CFP2 has a structure where the service providers-preferred data rates and optical component sizes are optimized, so as to be most frequently used.

Figure 1:
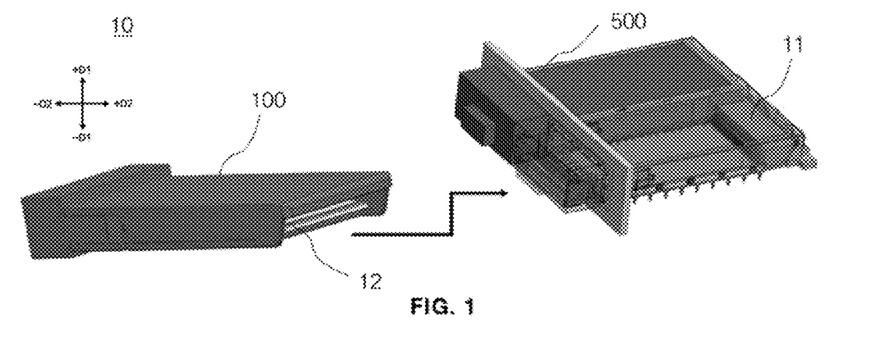
FIG. 1 depicts a diagram of an example an optical communication apparatus in which a CFP2-based case including one or more optical transceivers (not shown) is plugged into a main frame.

FIG. 1 depicts a diagram of an example an optical communication apparatus 10 in which a CFP2-based case 100 including one or more optical transceivers (not shown) is plugged into a main frame 500. By way of example, the main frame 500 may be configured to accommodate two CFP2-based case 100; in this case, it is understood that a dual CFP2 standard is applied to the optical communication apparatus 10. The optical transceiver 10 may be provided as a coupling type (e.g., plugin type) as shown in FIG. 1. A number of optical transceivers implemented using the optical transceiver 10 may be used to provide an optical network, and may be provided in a single rack to minimize a space occupied thereby. For example, the case 100 including the one or more optical transceivers (not shown) may be connected to the main frame 500 by connecting a male electrical connector 12 of the case 100 to a female electrical connector 11 of the main frame 500. Throughout the present disclosure, directions +D1, −D1, +D2, and −D2 are introduced to more clearly Illustrate dimensions and structures of the optical communication apparatus 100. The directions +D1 and −D1 are opposite to each other; the directions +D2 and −D2 are opposite to each other; and each of the directions +D1 and −D1 is perpendicular to each of the directions +D2 and −D2.

In order to receive an optical signal with no error, an optical power of the optical signal to be received by a receiver may have to be greater than a predetermined level. However, the longer the optical signals travels, the weaker the optical power of the optical signal. In order to compensate such optical power loss, an optical amplifier may be used. For example, an optical fiber-based optical amplifier is an amplifier which amplifies an optical power of the optical signal without converting the optical signal to an electrical signal and is popularly used in optical communication systems due to its immunity to optical nonlinearity.

Further, the optical amplifier may necessarily include optical components such as an amplifying fiber serving as a medium for amplifying an optical signal, a pumping light source for generating an excitation light source, etc. Such optical components (or an optical fiber) each has a certain size (e.g., a minimum size to be maintained) are affected by vending applied thereto or environments such as temperature, etc. Thus, auxiliary components or structures such as a guide, a holder, etc. may be used, and it is not easy in reality to implement the optical fiber-based optical amplifier with a smaller size than a certain value.

SUMMARY

As a data rate of an optical signal increases up to 40 Gbps or 100 Gbps, a required optical power increases, and thus optical amplifiers are essentially used in optical communication systems.

As mentioned above, many optical components have been standardized with e.g., CFP2, and each slot (e.g., the number of slots) is directly associated with cost. That is, since at least one optical amplifier may additionally be required for every single use of the optical transceiver, as a result, two slots may be required to mount the pair of the optical amplifier and the optical transceiver. This may result in an increase in cost.

Thus, an exemplary embodiment of the present invention provides a novel type of optical amplifier or optical transceiver whose occupied slot space is minimized (or whose space usage is maximized).

Also, an exemplary embodiment of the present invention provides a novel type of optical amplifier or optical transceiver whose assembly is easier (or simple) to reduce an assemble time and thus to improve a productivity.

In some aspect of the present invention, an apparatus comprising a case, an optical amplifier, and an optical transceiver is provided. The optical amplifier and the optical transceiver are included in the case. The case comprises a top portion and a bottom portion. The top portion includes first to third sections arranged in a direction perpendicular to a direction extending from the top portion to the bottom portion. The first section has a larger area than the third section. The second section divides the first and third sections. The third section comprises a first cavity including at least one portion of the optical amplifier. The optical amplifier is provided using at least one of an amplifying fiber, a pumping light source, an isolator, a wavelength-division multiplexer (WDM) coupler, a wavelength-variable optical filter, a monitoring-tap photo diode, and a driving control unit.

In one embodiment of the present invention, the apparatus may further include a main control unit. The first section may include a routing hole where the amplifying fiber is mounted. The second section may include a second cavity. The amplifying fiber may extend through the second cavity and may be connected to the at least one portion of the optical amplifier. The driving control unit may be implemented using a printed circuit board (PCB). A connector connecting the driving control unit and the main control unit may be provided within the second cavity.

In one embodiment of the present invention, the apparatus may further include a main control unit. The second section may include a second cavity. The amplifying fiber, the pumping light source, the isolator, the WDM coupler, the wavelength-variable optical filter, the monitoring-tap photo diode, and the driving control unit may be mounted in the first cavity. The driving control unit may be implemented using a printed circuit board (PCB). A connector connecting the driving control unit and the main control unit may be provided within the second cavity.

In one embodiment of the present invention, the apparatus may further include a main control unit. The second section may include a second cavity. An amplifying module unit of a box shape may be mounted in the first cavity may include the amplifying fiber, the pumping light source, the isolator, the WDM coupler, the wavelength-variable optical filter, the monitoring-tap photo diode, and the driving control unit. A connector connecting the driving control unit and the main control unit may extend at one end of the amplifying module unit, and the connector may be provided within the second cavity.

In one embodiment of the present invention, the apparatus may further include one or more supporting elements having a cantilever shape positioned around an outside of the first cavity. A portion of the one or more supporting elements may be coupled to one end of the second section where the second cavity is not provided.

In one embodiment of the present invention, the apparatus may further include one or more supporting elements having a cantilever shape positioned around an outside of the first cavity. A portion of the one or more supporting elements may be coupled to one end of the second section where the second cavity is not provided.

In one embodiment of the present invention, the apparatus may further include one or more supporting elements having a cantilever shape positioned around an outside of the first cavity. A portion of the one or more supporting elements may be coupled to one end of the second section where the second cavity is not provided.

In one embodiment of the present invention, the at least one portion of the optical amplifier may be fixed using a thermosetting molding material of a silicon gel type.

In one embodiment of the present invention, the amplifying fiber may be fixed using a thermosetting molding material of a silicon gel type.

In another aspect of the present invention, a method for manufacturing an apparatus including a case, an optical transceiver, and an optical amplifier is provided. The method includes providing the case including a top portion and a bottom portion, providing the top portion including first to third sections arranged in a direction perpendicular to a direction extending from the top portion to the bottom portion, providing a first cavity in the third section, and mounting at least one portion of the optical amplifier within the first cavity. The first section has a larger area than the third section and the second section divides the first and third sections. The optical amplifier is provided using at least one of an amplifying fiber, a pumping light source, an isolator, a wavelength-division multiplexer (WDM) coupler, a wavelength-variable optical filter, a monitoring-tap photo diode, and a driving control unit.

In one embodiment of the present invention, the method may further include providing a second cavity in the second section positioned between the first and second sections, providing a routing hole in the first section, mounting the amplifying fiber in the routing hole, and connecting the amplifying fiber to the at least one portion of the optical amplifier mounted in the third section through the second cavity.

In another aspect of the present invention, a method for manufacturing an apparatus including a case, an optical transceiver, and an optical amplifier is provided. The method includes providing the case including a top portion and a bottom portion, providing the top portion including first to third sections arranged in a direction perpendicular to a direction extending from the top portion to the bottom portion, providing a first cavity in the third section, mounting at least one portion of the optical amplifier within the first cavity, and providing an amplifying module unit of a box shape within the first cavity. The first section has a larger area than the third section and the second section divides the first and third sections. The amplifying module unit includes the at least one portion of the optical amplifier. The optical amplifier is provided using at least one of an amplifying fiber, a pumping light source, an Isolator, a wavelength-division multiplexer (WDM) coupler, a wavelength-variable optical filter, a monitoring-tap photo diode, and a driving control unit.

In one embodiment of the present invention, the method may further include providing one or more supporting elements having a cantilever shape around an outside of the first cavity and fixing the at least one portion of the optical amplifier mounted in the first cavity to the first cavity using a thermosetting molding material of a silicon gel type.

In another aspect of the present invention, an apparatus comprising a case, an optical amplifier, and an optical transceiver is provided. The optical amplifier and the optical transceiver are included in the case. The case comprises a top portion and a bottom portion coupled to each other through one or more connecting elements. The top portion includes first and second sections arranged in a first direction perpendicular to a second direction extending from the bottom portion to the top portion. The first section has a larger area than the second section. The second section comprises a cavity in which an amplifying module unit is mounted. The amplifying module unit comprises a first portion for mounting the optical amplifier and a coupling-supported portion formed on one end of the first portion. The top and bottom portions of the case are coupled to each other through one or more connecting holes formed in the coupling-supported portion.

In one embodiment of the present invention, the apparatus may further include an electrical connector coupled between the amplifying module unit and the bottom portion of the case. The electrical connector may have one or more holes corresponding to the one or more connecting holes of the coupling-supported portion through which the top and bottom portions of the case and the electrical connector are coupled to each other.

In one embodiment of the present invention, the amplifying module unit may further include one or more protrusions extending toward one or more holes formed in the first section. The amplifying module unit may be configured to be coupled to the first section by plugging the one or more protrusions into the one or more holes of the first section.

In one embodiment of the present invention, the amplifying module unit may further include one or more grooves on sides thereof, and the second section of the case further comprises one or more sliding rails formed on sides thereof. Each of the one or more sliding rails may be configured to be paired to a corresponding one of the one or more grooves to have the amplifying module unit to slide into the second section.

In one embodiment of the present invention, the amplifying module unit may further include one or more sliding rails formed on sides thereof, and the second section of the case further comprises one or more grooves on sides thereof. Each of the one or more sliding rails may be configured to be paired to a corresponding one of the one or more grooves to have the amplifying module unit to slide into the second section.

As described above, the apparatus or method according to an exemplary of the present invention allows to maximize a space usage with an optical transceiver standardized with no separate slot room to accommodate an optical amplifier therein.

This may cause a decrease in system cost to allow to increase a price competitiveness, and thus, an efficiency may be improved. Also, forming a separate cavity in the apparatus may make it easy to assemble parts of the apparatus and reduce an assemble time, and thus, an overall productivity may be Increased.

DETAILED DESCRIPTION OF THE EMBODIMENTS

Hereinafter, preferred exemplary embodiments of the present invention will be described with reference to accompanying drawings in order to describe the present invention in detail to the extent that a person skilled in the art to which the invention pertains can easily enforce the technical concept of the present invention. It will be understood that various modifications in form and details may be made thereto without departing from the spirit and scope of the present invention.

In the drawings, the shapes, dimensions, etc., of elements may be exaggerated for clarity, and the same reference numerals may designate the same or like elements throughout the specification and drawings.

Figures 2A, 2B, 2C:
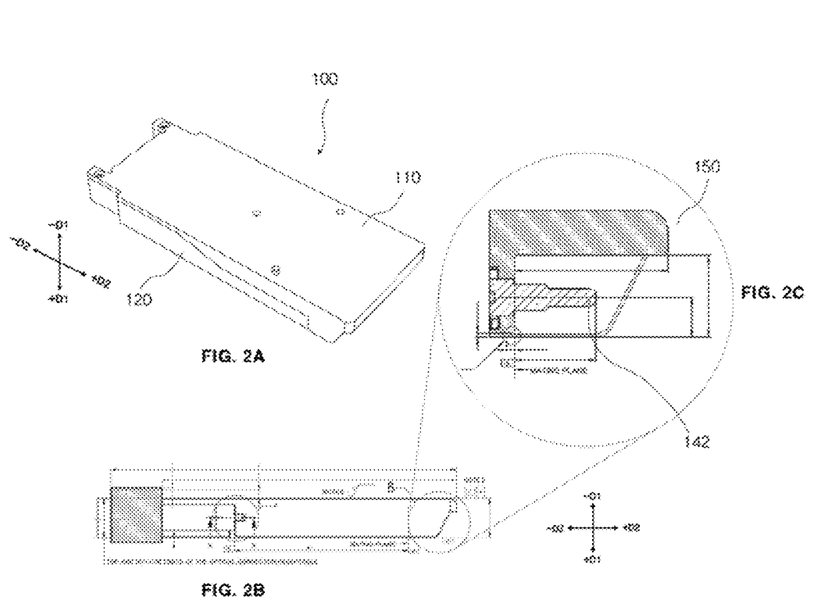
FIG. 2A depicts a top-view diagram of the case 100 whose top and bottom portions 110 and 120 are coupled to each other.
FIG. 2B depicts a side-view diagram of the case of FIG. 2A.
FIG. 2C depicts an enlarged diagram of a portion B of the case of FIG. 2B.

FIG. 2A depicts a top-view diagram of the case 100 whose top and bottom portions 110 and 120 are coupled to each other. Here, the top portion 110 of the case 100 is one positioned toward the direction −D1 (e.g., a downward direction of FIG. 1), and the bottom portion 120 of the case 100 is one positioned toward the direction +D1; for example, the case 100 depicted in FIG. 2A may be an upside down version of the case 100 depicted in FIG. 1. FIG. 2B depicts a side-view diagram of the case 100 of FIG. 2A. As seen in various dimensions (e.g., 107.50 mm, 91.50 mm, 12.40 mm, etc.) indicated at a lower portion of FIG. 2B, sizes required for the standardized CPF2-based case 100 are relatively small. FIG. 2C depicts an enlarged diagram of a portion B of the case 100 of FIG. 2B.

Figure 3:
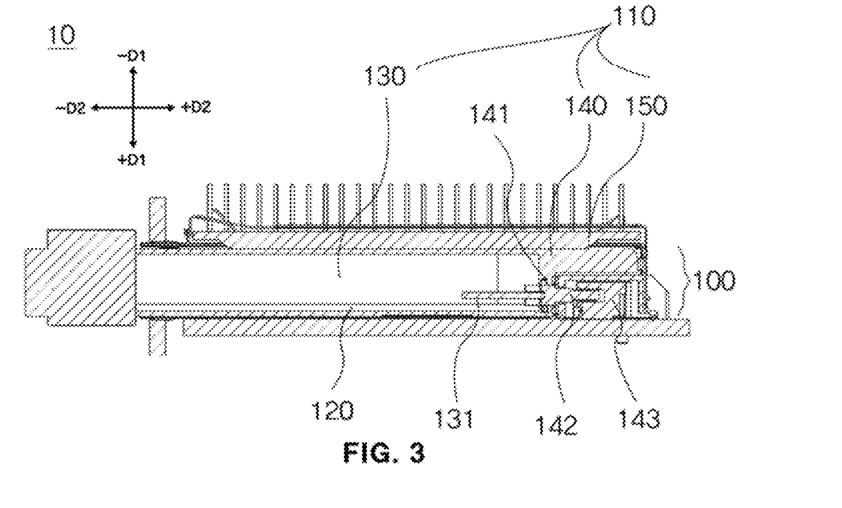
FIG. 3 depicts a transparent side-view diagram of an optical communication apparatus of FIG. 1.
Figure 4:
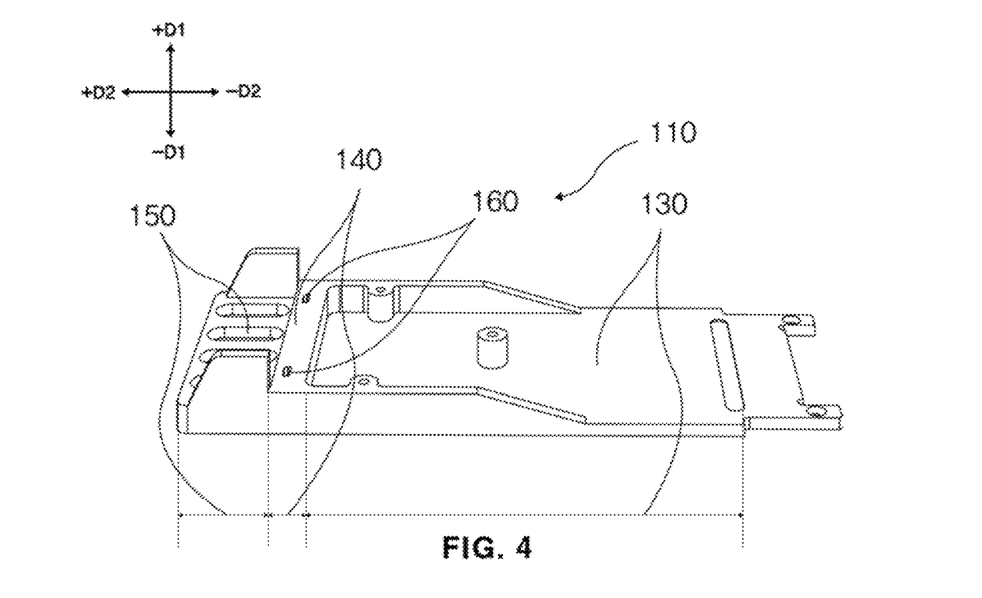
FIG. 4 depicts an exemplary diagram of the top portion of the case of FIG. 1 for mounting an optical transceiver.
Figure 5:
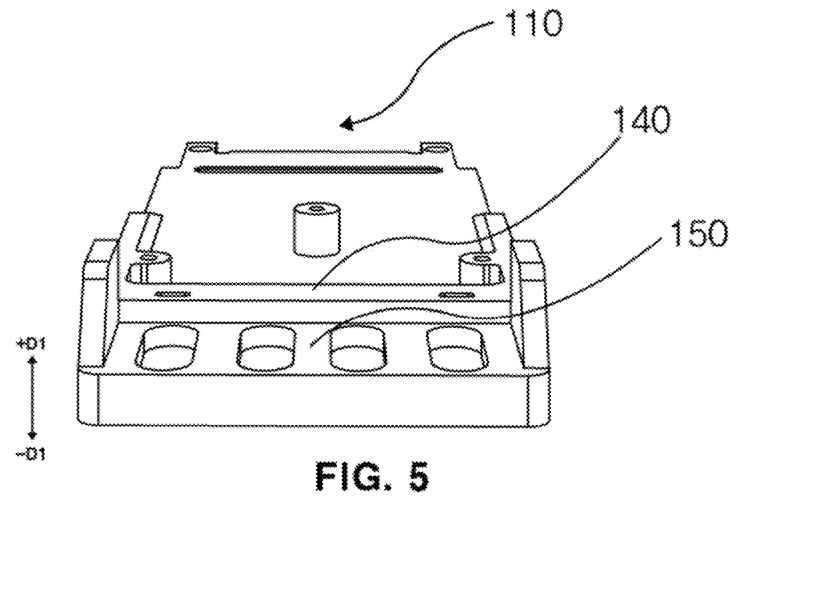
FIG. 5 depicts another view of the top portion 110 of FIG. 4.

FIG. 3 depicts a transparent side-view diagram of the optical communication apparatus 10 of FIG. 1. The optical communication apparatus 10 depicted in FIG. 3 may be an upside down version of the optical communication apparatus 10 depicted in FIG. 1. FIG. 4 depicts an exemplary diagram of the top portion 110 of the case 100 for mounting an optical transceiver. The top portion 110 depicted in FIG. 4 may be an upside down and left-right reversed version of the top portion 110 depicted in FIG. 2A. FIG. 5 depicts another view of the top portion 110 of FIG. 4.

Further particularly, referring to the examples depicted in FIGS. 3 to 5, the top portion 110 includes a first section 130, a dividing section 140, and a second section 150 which, e.g., are arranged in the direction +D2 perpendicular to the direction +D1 extending from the top portion 110 to the bottom portion 120. As depicted, an area of the first section 130 is larger than an area of the second section 140. The first section 130 is configured to cover a position where an optical transceiver is located; for example, the optical transceiver may be provided in (or underneath) the first section 130. The dividing section 140 is configured to divide the first and second sections 130 and 140, divide the optical transceiver from other components such as at least one of components constituting an optical amplifier, support an electrical connector 142 (e.g., a male electrical connector) (FIG. 3) attached to a main control unit 131 (FIG. 3), couple the electrical connector 142 to another electrical connector 143 (e.g., a female electrical connector) (FIG. 5). The second section 150 is configured to cover the electrical connector 143 when the electrical connector 142 is coupled to the electrical connector 143.

As shown in FIGS. 2A-2C and 3-5, since the external shape of the second section 150 is standardized for being universally used and the case 100 is a relatively small, it might not be easy to mount an additional optical amplifier within the case 100 if necessary.

To address the foregoing issues, exemplary embodiments of the present invention provides a novel structure where an optical amplifier can be mounted in the CFP2-based case (e.g., 100). Hereinafter, the exemplary embodiments of the present invention will be described with reference to FIGS. 6-9.

Figure 6:
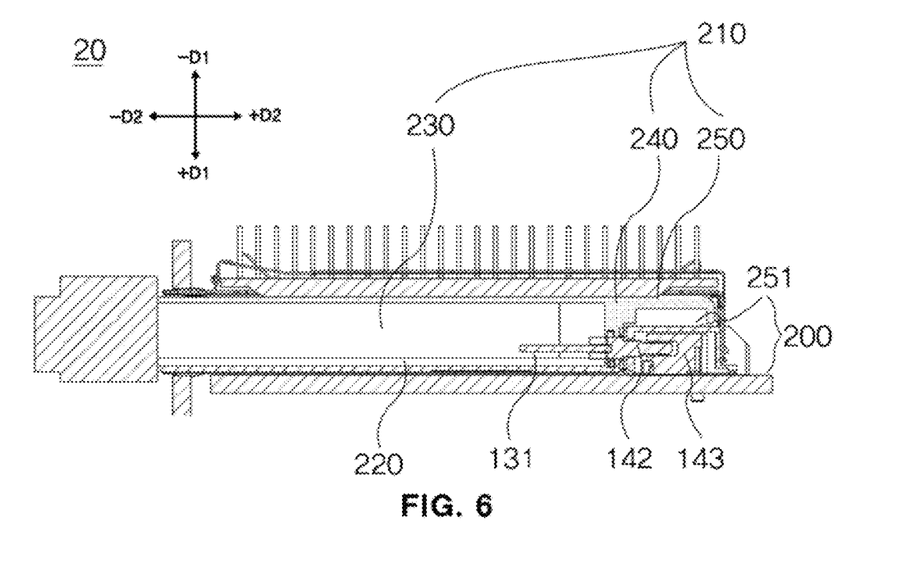
FIG. 6 depicts a transparent side-view diagram of an optical communication apparatus where a case including one or more optical transceivers is coupled to a main frame according to an exemplary embodiment of the present invention.
Figure 7:
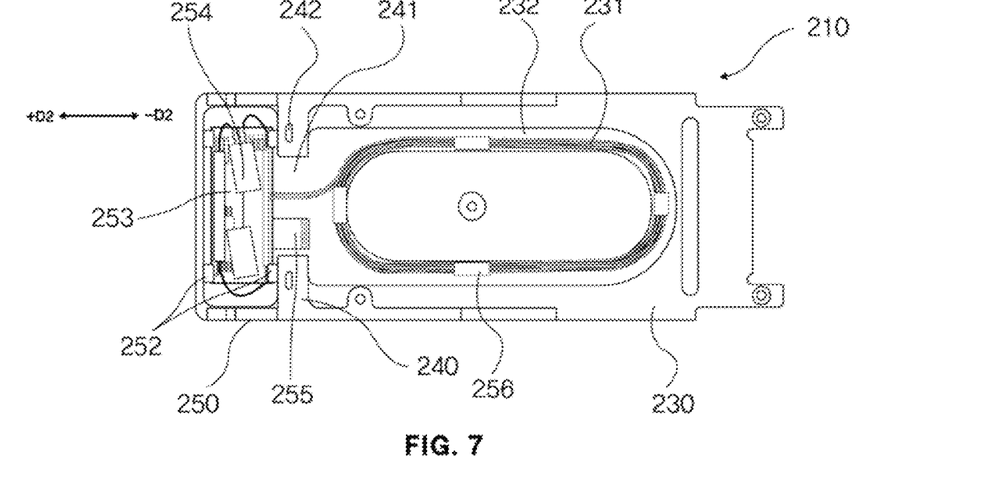
FIGS. 7 to 9 are exemplary diagrams of a top portion of the case of FIG. 6 according to exemplary embodiments of the present invention.
Figure 8:
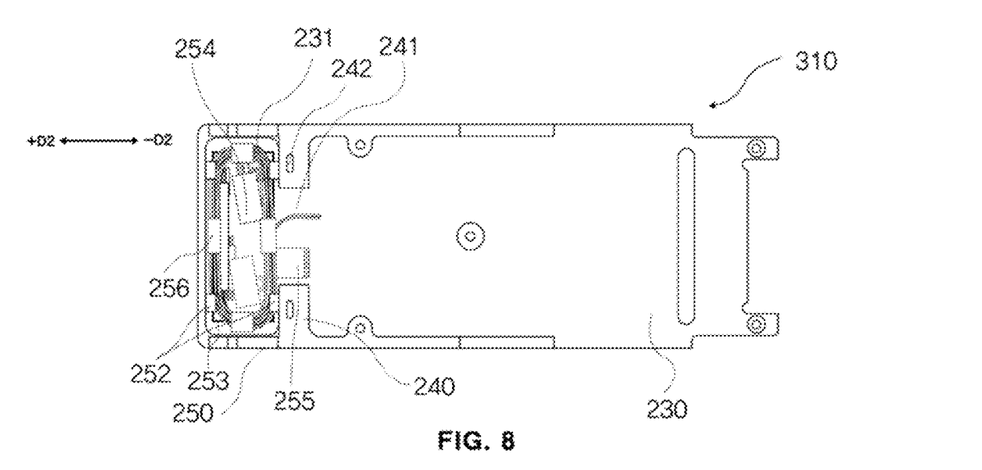
Figure 9:
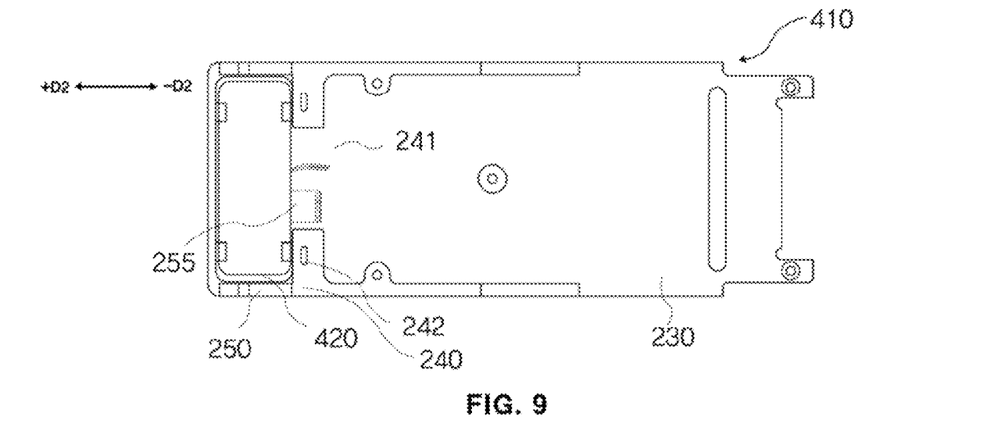

FIG. 6 depicts a transparent side-view diagram of an optical communication apparatus 20 where a case 200 including one or more optical transceivers (not shown) is coupled to a main frame (e.g., 500 of FIG. 1) according to an exemplary embodiment of the present invention. FIGS. 7 to 9 are exemplary diagrams of a top portion 210 of the case 200 of FIG. 6 according to exemplary embodiments of the present invention.

The top portion 210 of the case 200 for mounting an optical transceiver and an optical amplifier according to a first embodiment of the present invention is described with reference to FIG. 7. Referring back to the example depicted in FIG. 6, for a case to be used in a system implemented based on the CFP2 standard, the external shape (or structure) of the case 200 of FIG. 7 may be substantially the same as that of the case 100 of FIG. 3, however the internal shape (or structure) of the case 200 of FIG. 6 may be different than the case 100 of FIG. 3. Referring still to FIG. 6, the case 200 of FIG. 6 may include a top portion 210 and a bottom portion 220. The top portion 210 may include a first section 230, a dividing section 240, and a second section 250 arranged in the direction +D2 perpendicular to the direction +D1 extending from the top portion 210 to the bottom portion 220. The first section 230 has a larger area than the second section 250. The dividing section 240 divides the first and second sections 230 and 250.

Referring to FIG. 7, an optical amplifier (not shown in FIG. 6, but shown in FIG. 7) in the case 200 of FIG. 6 may include: an amplifying fiber 231 such as an erbium-doped fiber (EDF), assorted optical components 254 such as a pumping light source, an isolator, a wavelength-division multiplexer (WDM) coupler, a wavelength-variable optical filter, a monitoring tap photo-diode, etc., and a driving control unit 253 for driving the pumping light source.

Generally, some optical components may be sensitive to ambient conditions (e.g., temperatures, humidity), and an optical fiber may have different optical losses depending on a degree of vending applied thereon. Thus, it is important to mount and package one or more optical components in a case.

Referring to FIGS. 6 and 7, in some aspects, in order to implement an optical amplifier in the top portion 210, a routing hole 232 (e.g., a winding hole) is provided in (or underneath) the first section 230 of the top portion 210, so that the amplifying fiber 231 can be winded around the routing hole 232 to be mounted. A depth of the routing hole 232 may be formed to be thinner than a thickness of the standardized top portion 210. Further, the routing hole 232 may be formed in a circular shape or in an oval shape. In some aspects, when a shape of the case compatible with the CFP2 standard is considered, the routing hole 232 with an oval shape is preferred. Also, the amplifying fiber 232 may be a specialized EDF with a low vending loss, rather than a general EDF having a higher vending loss than the specialized EDF. This is because due to a relatively small size of the case 200 (FIG. 6) provided according to the CFP2 standard, if the general EDF is used, a vending loss may thus be increased. Thus, it is preferred that when the routing hole 232 is formed in a circular shape (or an oval shape), a radius of the circular shape may be larger than, e.g., 5 mm. In some aspects, the routing hole 232 may be formed to have as a big radius as possible. The EDF 231 provided in the routing hole 232 extends to the second section 250 across the dividing section 240 (e.g., through a cavity formed in the dividing section 240) to be connected the optical components provided in (or underneath) the second section 250. In this case, the EDF 231 may be provided in the routing hole 232 of the first section 230. In some aspects, a separate element is used to fix the amplifying fiber 232 to the first section 230. Also, the amplifying fiber 231 mounted in the routing hole 232 can be fixed using a molding material (e.g., silicon or silicon-gel), or the like.

Referring to the example depicted in FIG. 3, the dividing section 140 is provided to have a rectangular shape between the first and second sections 130 and 150. However, as shown in FIGS. 6 and 7, the dividing section 240 in accordance with one embodiment is provided to have a rectangular shape between the first and second sections 230 and 250, further including a cavity 241 at a center of the rectangular shape. As described above, since the EDF 231 extends from the first section 230 to the second section 250, the cavity 241 may be used to have the EDF 231 to extend between the first and second sections 230 and 250. A connector 255 (FIG. 7) of the driving control unit 253 may be provided in the cavity 241. The cavity 241 may provide a space for testing an optical amplifier using the main control unit 131.

In the dividing section 240, the electrical connector 142 may be coupled to a connecting hole 242 in the dividing section 240. Since the dividing section 140 of FIG. 3 has no cavity, a coupling between the dividing section 140 and the electrical connector 142 is solid. However, since the dividing section 240 of FIG. 6 has the cavity 241, a coupling strength between the dividing section 240 and the electrical connector 142 is relatively weak compared to the case 100 of FIG. 3. This problem can be mitigated by forming a plurality of support elements 252 (FIG. 7) on one end of the dividing section 240 and/or one end of the second section 250 to enlarge the area for supporting the electrical connector 142. In some aspects, two of the plurality of support elements 252 may be provided around the connecting hole 242.

While the second section 150 of FIG. 3 has no additional space (or structure) other than a structure for power dissipation, the second section 250 of FIGS. 6 and 7 may further include a cavity 251. The cavity 251 is formed, but not to modify or change an outer shape of the top portion 210 of the case 200 to comply with the CFP2 standard. The driving control unit 235 and the optical components 254 of the optical amplifier may be provided in the cavity 251. The driving control unit 253 may be implemented using a printed circuit board (PCB). Given that a size of the 251 is a relatively small, the optical components 254 may include optical fibers with relatively low vending loss and/or compact size optical components to be mounted in the cavity 251. In one example, the optical components 254 include one or a combination of at least one of a pumping light source, an isolator, a wavelength-division multiplexer (WDM) coupler, a wavelength variable optical filter, a monitoring tap, etc. The pumping light source, the isolator, the WDM coupler are optical components used for an optical fiber-based optical amplifier (e.g., EDFA). The WDM coupler is used to mitigate an optical signal-to-noise ratio (OSNR) at an output of the optical amplifier.

Referring to FIGS. 6 and 7, a driving control unit connector 255 connects the driving control unit 253 and the main control unit 131 (FIG. 6). The driving control unit connector 255 is provided across (or within) the cavity 241. Further, the driving control unit connector 255 may facilitate a module-based testing after connecting parts. Further, such features may facilitate detection of abnormality (e.g., fault, error, malfunction) for each module and easier management.

In order to mount the driving control unit 253 and the optical components 254 within the cavity 251, the driving control unit 253 may be provided on the bottom surface (not shown) of the cavity 251.

In addition, the optical components 254 are provided on the driving control unit 253. In this case, a dividing element (not shown) may be disposed in a portion between the driving control unit 253 and the optical components 253 to prevent a short circuit therebetween.

In some aspects, when the top portion 210 of the case 200 is coupled to the bottom portion 220 thereof, a back-side (not shown) of the top portion 210 may be positioned in an upward direction, and a front-side (as shown in FIG. 7) of the top portion 210 thereof may be positioned in a downward direction, and thus, coupled to one end of the bottom portion 220. Thus, the driving control unit and the optical components 253 and 254 may be floated (or dislodged) from the bottom surface of the cavity 251 due to, e.g., gravity. In this case, the driving control unit 253 and the optical components 253 and 254 need to be fixed to, e.g., the cavity 251 using a molding material. For example, a silicon-type (or silicon gel type) thermosetting molding liquid can be used as the molding material. Such silicon-type (or silicon gel type) thermosetting molding liquid has a higher heat conductivity than other molding materials, thus it is preferably used for heat dissipation. For example, since the silicon-type thermosetting molding liquid is cured to contact with a face of the top portion 210 of the case. In some aspects, a separate jig (not shown) may be provided to prevent the molding liquid from leaking through the cavity 241. The molding liquid may be injected using an Injection needle and then cured. The molding liquid is guided along with the jig, and thus a shape of the molding material after the molding liquid is cured can be formed using the jig. The shape of the molding material may be determined by considering a shape of the CFP2-based case 200 and a surface area for power dissipation. Thus, the driving control unit and the optical components 253 and 254 are molded at the same time. Referring back to FIG. 5B, when the top portion 210 and the bottom portion 220 are coupled, the EDF 231, the optical components 254, and the driving control unit 253 fixed to the cavity 251 may interfere with the electrical connector 142 and the electrical connector 143. Thus, to prevent such interference, a separate covering element (not shown) for covering the second section 250 may be further coupled.

A top portion 310 of the case 200 for mounting an optical transceiver and an optical amplifier according to a second embodiment of the present invention is described with reference to FIG. 8. The top portion 310 of FIG. 8 has substantially the same structure as the top portion 210 of FIG. 7 except that the EDF 232 of FIG. 8 is provided in the cavity 251. Thus, duplicate descriptions thereof will be omitted for the sake of simplicity. Referring to the example depicted in FIG. 8, the top portion 310 may include the first section 230, the dividing section 240, and the second section 250 arranged in the direction +D2 perpendicular to the direction +D1 extending from the top portion 210 to the bottom portion 220. The first section 230 has a larger area than the second section 250. The dividing section 240 divides the first and second sections 230 and 250. In some aspects, one or more optical transceiver may be provided in the first section 230.

As shown in FIGS. 6 and 8, the dividing section 240 in accordance with one embodiment is provided to have a rectangular shape between the first and second sections 230 and 250, further including a cavity 241 at a center of the rectangular shape.

The dividing section 240 may include the coupling hole 242. The coupling hole 242 may be coupled to the electrical 142. Unlike the dividing section 140 of FIG. 3, the dividing section 240 with the cavity 241, a coupling strength between the dividing section 240 and the electrical connector 142 is relatively weak. This problem can be mitigated by forming a plurality of support elements 252 (FIG. 8) on one end of the dividing section 240 and/or one end of the second section 250 to enlarge the area for supporting the electrical connector 142. In some aspects, two of the plurality of support elements 252 may be provided around the connecting hole 242.

The cavity 251 may be provided in (or underneath) the second section 250. In order to mount the driving control unit 253 and the optical components 254 within the cavity 251, the driving control unit 253 may be provided on the bottom surface (not shown) of the cavity 251. In addition, the optical components 254 are provided on the driving control unit 253. In this case, a dividing element (not shown) may be disposed in a portion between the driving control unit 253 and the optical components 253 to prevent a short circuit therebetween.

Referring to FIGS. 6 and 8, the driving control unit connector 255 connects the driving control unit 253 and the main control unit 131 (FIG. 6). The driving control unit connector 255 is provided across (or within) the cavity 241. Further, the driving control unit connector 255 may facilitate a module-based testing after connecting parts.

The EDF 231 is mounted on the driving control unit 253 within the cavity 251 by winding it in an oval shape therein. In this case, in order to guide or fix the EDF 231, a supporting element 256 (e.g., an inner groove) may be provided. The optical components 254 may be provided inside the EDF 231 mounted in the cavity 251. The driving control unit 253, the EDF, and the optical components 254 need to be fixed to, e.g., the cavity 251 using a molding material. For example, a silicon-type thermosetting molding liquid can be used as the molding material. Referring back to FIG. 6, when the top portion 210 and the bottom portion 220 are coupled, the EDF 231, the optical components 254, and the driving control unit 253 fixed to the cavity 251 may interfere with the electrical connector 142 and the electrical connector 143. Thus, to prevent such interference, a separate covering element (not shown) for covering the second section 250 may be further coupled.

A top portion 410 of the case 200 for mounting an optical transceiver and an optical amplifier according to a third embodiment of the present invention is described with reference to FIG. 9. The top portion 410 of FIG. 9 has substantially the same structure as the top portion 310 of FIG. 8 except that an amplifying module unit 420 (to be described more in detail as below) is provided in the cavity 251 and the EDF 231 is provided in the amplifying module unit 420. Thus, duplicate descriptions thereof will be omitted for the sake of simplicity. For example, the third embodiment of FIG. 9 may have advantages over the second embodiment of FIG. 8 in terms of productivity, testing conveniences after assembling an optical amplifier, etc. Referring to FIGS. 6 and 9, in mounting an optical amplifier in (or underneath) the second section 250, the top portion 410 may include the first section 230, the dividing section 240, and the second section 250. The second section 250 includes the cavity 251 and an amplifying module unit 420 having, e.g., a box shape (or hexahedron). The amplifying module unit 420 may be coupled to the cavity 251. Also, the optical amplifier (not shown) may be mounted in the above amplifying module unit 420. In some aspects, the amplifying module unit 420 may have a rectangular shape formed of a plastic material and may further include a hole to pass through the driving control unit connector 255.

Referring to the example depicted in FIG. 9, one or more support elements 252 may be provided on one end of the dividing section 240 and/or one end of the second section 250 to fix (or support) the amplifying module unit 251. In some aspects, two of the plurality of support elements 252 may be provided around the connecting hole 242. In another aspects, no support element 252 may be provided; the amplifying module unit may be fixed (or supported) without the support element 252.

The driving control unit 253 may be provided on a bottom surface of the amplifying module unit 420. The driving control unit connector 255 may be provided outside the amplifying module unit 420. The driving control unit connector 255 connects the driving control unit 253 and the main control unit 131 through the cavity 241 of the dividing section 240. Further, the driving control unit connector 255 may facilitate a module-based testing after connecting parts.

The EDF 231 is mounted within the amplifying module unit 420 by winding it in an oval shape therein. The optical components 254 may be provided inside the EDF 231 mounted in the cavity 251. The EDF 231 and the optical components 254 can be fixed to an inner portion of the amplifying module unit 420. By way of example, positions of the driving control unit 250 and the EDF 231 may be exchangeable.

Although the EDF 231 is mounted inside the amplifying module unit 420 according the third embodiment, the present invention is not limited thereto. By way of example, a routing hole 232 may be provided in the first section 230, and the amplifying module unit 420 may be provide to include the optical components 254, the driving control unit 253, or other components other than the EDF 231.

Figure 10:
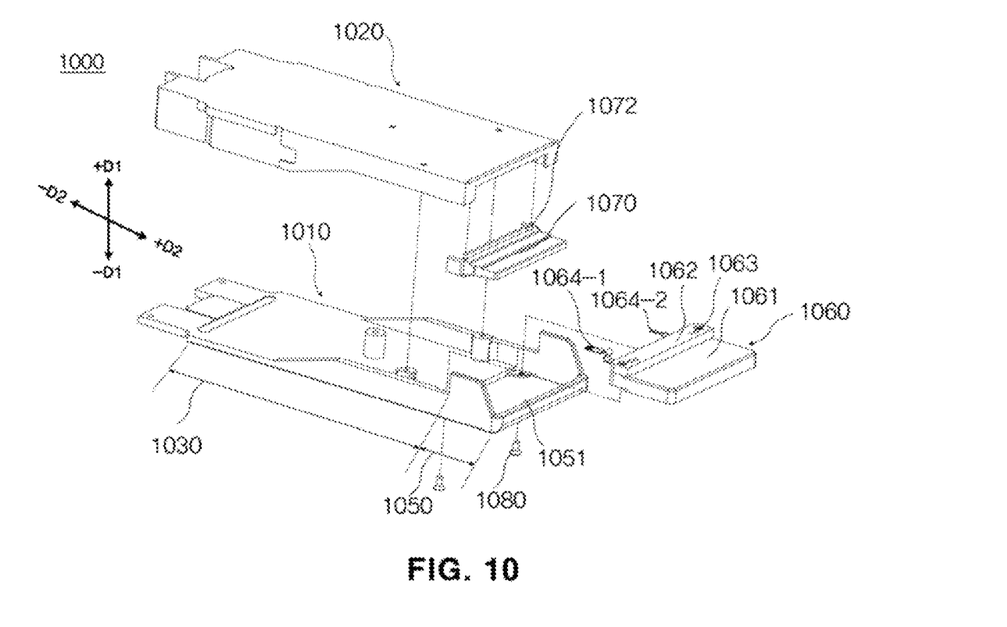
FIG. 10 depicts a perspective-view diagram of an example case for mounting an optical transceiver and an optical amplifier according to exemplary embodiments of the present invention.
Figure 11:
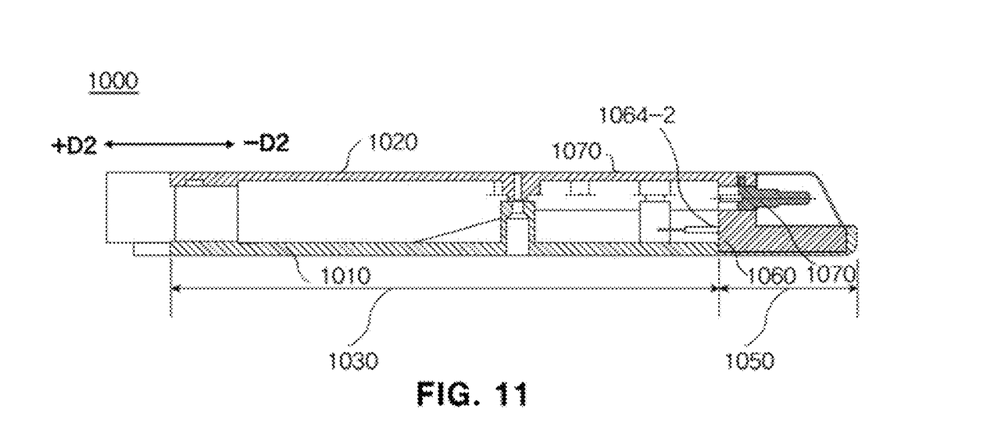
FIG. 11 is a side-view diagram of the case 1000 of FIG. 10 according to an exemplary embodiment of the present invention.

FIG. 10 depicts a perspective-view diagram of an example case 1000 for mounting an optical transceiver and an optical amplifier according to an exemplary embodiment of the present invention. FIG. 11 is a side-view diagram of the case 1000 of FIG. 10 according to an exemplary embodiment of the present invention.

Referring to FIG. 10, the case 1000 may include a top portion 1010 and a bottom portion 1020 which are coupled to each other. The top portion 1010 of the case 1000 may include a first section 1030 and a second section 1050 arranged in the direction +D2 perpendicular to the direction +D1 extending from the top portion 1010 to the bottom portion 1020. The first section 1030 has a larger area than the second section 1050. The at least one optical transceiver (not shown) may be provided in the first section 1030. The optical amplifier (not shown) may be provided in the second section 1050. In some aspects, the second section 1050 may include a cavity 1051, and an amplifying module unit 1060 including the optical amplifier (not shown) may be provided in the cavity 1051. Further, the amplifying module unit 1060 may include a first portion 1061 for mounting the optical amplifier and a coupling-supported portion 1062 formed on one end of the first portion 1061.

The case 1000 may further include an electrical connector 1070 to be connected to an electrical connector of a main frame (not shown) (e.g., 500 of FIG. 1), and thus forming an optical communication apparatus (not shown). In addition, at least one first connecting hole 1071 may be formed in the electrical connector 1070, and another at least one second connecting hole 1063 may be formed (at a corresponding location to the first connecting hole 1071) in the coupling-supported portion 1062. Thus, the bottom portion 1020, the electrical connector 1070, the amplifying module unit 1060, and the top portion 1010 may be coupled with one or more connecting elements 1080 (e.g., screws) through the connecting holes 1071 and 1063. In some aspects, the electrical connector 1070 may be disposed between the amplifying module unit 1060 and the top portion 1010.

In some embodiments, the amplifying module unit 1060 may further include an optical input/output (I/O) port 1064-1 and an electrical I/O port 1064-2. By way of example, the optical I/O port 1064-1 may be coupled (e.g., spliced) to the optical transceiver (not shown) in, e.g., the first section 1030, and the electrical I/O port 1064-2 may be coupled to, e.g., at least a main control unit (not shown) (e.g., 131 of FIG. 6). By way of further example, the optical I/O port 1064-1 may be embodied using a bare fiber or other standard optical connectors such as SC, LC, or the like.

In some embodiments, the amplifying module unit 1060 may further include one or more protrusions (e.g., pins) (not shown) extending toward one or more holes (not shown) formed in the first section 1030 (e.g., in the direction −D2). The amplifying module unit 1060 may be configured to be coupled to the first section 1030 by plugging the one or more protrusions into the one or more holes of the first section 1030.

In some embodiments, the amplifying module unit 1060 may further include one or more grooves (not shown) on sides thereof, and the second section 1050 of the case 1000 may further include one or more sliding rails (not shown) formed on sides thereof. In this case, each of the one or more sliding rails may be configured to be paired to a corresponding one of the one or more grooves to have the amplifying module unit 1060 to slide into the second section 1050.

In some embodiments, the amplifying module unit 1060 may further include one or more sliding rails (not shown) on sides thereof, and the second section 1050 of the case 1000 may further include one or more grooves (not shown) formed on sides thereof. In this case, each of the one or more sliding rails may be configured to be paired to a corresponding one of the one or more grooves to have the amplifying module unit 1060 to slide into the second section 1050.

In the case 100 of FIG. 3, the dividing section 140 exists between the first and second sections 130 and 150 to support or hold the electrical connector 142. However, in the case 1000 of FIG. 10, no dividing section exists between the first and second sections 1030 and 1050; instead the electrical connector 1070 can be supported by being coupled to the coupling-supported portion 1062 of the amplifying module unit 1060.

In some embodiments, although not shown in figures, a method for manufacturing the case 1000 of FIG. 10 is provided. The method may include: coupling the electrical connector 1070 to the bottom portion 1020 of the case 1000; coupling the respective optical and electrical I/O ports 1064-1 and 1064-2 of the optical amplifying module unit 1060 to the optical transceiver (not shown) and a main control unit (not shown) (e.g., 131 of FIG. 6); coupling the top portion 1010 to the optical amplifying module unit 1060 and the bottom portion 1020.

What is claimed is:

1. An apparatus comprising a case, an optical amplifier, and an optical transceiver, the optical amplifier and the optical transceiver included in the case,
    wherein the case comprises a top portion and a bottom portion, the top portion including first to third sections arranged in a direction perpendicular to a direction extending from the top portion to the bottom portion, wherein the first section has a larger area than the third section and the second section divides the first and third sections,
    wherein the third section comprises a first cavity including at least one portion of the optical amplifier, and
    wherein the optical amplifier is provided using at least one of an amplifying fiber, a pumping light source, an isolator, a wavelength-division multiplexer (WDM) coupler, a wavelength-variable optical filter, a monitoring-tap photo diode, and a driving control unit.

2. The apparatus of claim 1, further comprising a main control unit,
    wherein the first section includes a routing hole where the amplifying fiber is mounted,
    wherein the second section includes a second cavity,
    wherein the amplifying fiber extends through the second cavity and is connected to the at least one portion of the optical amplifier,
    wherein the driving control unit is implemented using a printed circuit board (PCB), and
    wherein a connector connecting the driving control unit and the main control unit is provided within the second cavity.

3. The apparatus of claim 1, further comprising a main control unit,
    wherein the second section includes a second cavity,
    wherein the amplifying fiber, the pumping light source, the isolator, the WDM coupler, the wavelength-variable optical filter, the monitoring-tap photo diode, and the driving control unit are mounted in the first cavity,
    wherein the driving control unit is implemented using a printed circuit board (PCB), and
    wherein a connector connecting the driving control unit and the main control unit is provided within the second cavity.

4. The apparatus of claim 1, further comprising a main control unit,
    wherein the second section includes a second cavity,
    wherein an amplifying module unit of a box shape is mounted in the first cavity and includes the amplifying fiber, the pumping light source, the isolator, the WDM coupler, the wavelength-variable optical filter, the monitoring-tap photo diode, and the driving control unit,
    wherein a connector connecting the driving control unit and the main control unit extends at one end of the amplifying module unit, and the connector is provided within the second cavity.

5. The apparatus of claim 2, further comprising one or more supporting elements having a cantilever shape positioned around an outside of the first cavity,
    wherein a portion of the one or more supporting elements is coupled to one end of the second section where the second cavity is not provided.

6. The apparatus of claim 3, further comprising one or more supporting elements having a cantilever shape positioned around an outside of the first cavity,
    wherein a portion of the one or more supporting elements is coupled to one end of the second section where the second cavity is not provided.

7. The apparatus of claim 4, further comprising one or more supporting elements having a cantilever shape positioned around an outside of the first cavity,
    wherein a portion of the one or more supporting elements is coupled to one end of the second section where the second cavity is not provided.

8. The apparatus of claim 1,
    wherein the at least one portion of the optical amplifier is fixed using a thermosetting molding material of a silicon gel type.

9. The apparatus of claim 2,
    wherein the amplifying fiber is fixed using a thermosetting molding material of a silicon gel type.

10. A method for manufacturing an apparatus including a case, an optical transceiver, and an optical amplifier, comprising:
    providing the case including a top portion and a bottom portion;
    providing the top portion including first to third sections arranged in a direction perpendicular to a direction extending from the top portion to the bottom portion, wherein the first section has a larger area than the third section and the second section divides the first and third sections;
    providing a first cavity in the third section; and
    mounting at least one portion of the optical amplifier within the first cavity,
    wherein the optical amplifier is provided using at least one of an amplifying fiber, a pumping light source, an isolator, a wavelength-division multiplexer (WDM) coupler, a wavelength-variable optical filter, a monitoring-tap photo diode, and a driving control unit.

11. A method for manufacturing an apparatus including a case, an optical transceiver, and an optical amplifier, comprising:
    providing the case including a top portion and a bottom portion;
    providing the top portion including first to third sections arranged in a direction perpendicular to a direction extending from the top portion to the bottom portion, wherein the first section has a larger area than the third section and the second section divides the first and third sections;
    providing a first cavity in the third section;
    mounting at least one portion of the optical amplifier within the first cavity;
    providing an amplifying module unit of a box shape within the first cavity; and
    wherein the amplifying module unit includes the at least one portion of the optical amplifier, and
    wherein the optical amplifier is provided using at least one of an amplifying fiber, a pumping light source, an isolator, a wavelength-division multiplexer (WDM) coupler, a wavelength-variable optical filter, a monitoring-tap photo diode, and a driving control unit.

12. The method of claim 10, further comprising:
    providing a second cavity In the second section positioned between the first and second sections;

providing a routing hole in the first section;
mounting the amplifying fiber in the routing hole; and
connecting the amplifying fiber to the at least one portion of the optical amplifier mounted in the third section through the second cavity.

13. The method of claim 11, further comprising:
providing one or more supporting elements having a cantilever shape around an outside of the first cavity; and
fixing the at least one portion of the optical amplifier mounted in the first cavity to the first cavity using a thermosetting molding material of a silicon gel type.

14. An apparatus comprising a case, an optical amplifier, and an optical transceiver, the optical amplifier and the optical transceiver included in the case,
wherein the case comprises a top portion and a bottom portion coupled to each other through one or more connecting elements, the top portion including first and second sections arranged in a first direction perpendicular to a second direction extending from the bottom portion to the top portion, wherein the first section has a larger area than the second section,
wherein the second section comprises a cavity in which an amplifying module unit is mounted,
wherein the amplifying module unit comprises a first portion for mounting the optical amplifier and a coupling-supported portion formed on one end of the first portion,
wherein the top and bottom portions of the case are coupled to each other through one or more connecting holes formed in the coupling-supported portion.

15. The apparatus of claim 14, further comprising:
an electrical connector coupled between the amplifying module unit and the bottom portion of the case, the electrical connector having one or more holes corresponding to the one or more connecting holes of the coupling-supported portion through which the top and bottom portions of the case and the electrical connector are coupled to each other.

16. The apparatus of claim 14, wherein the amplifying module unit further comprises one or more protrusions extending toward one or more holes formed in the first section, wherein the amplifying module unit is configured to be coupled to the first section by plugging the one or more protrusions into the one or more holes of the first section.

17. The apparatus of claim 14, wherein the amplifying module unit further comprises one or more grooves on sides thereof, and the second section of the case further comprises one or more sliding rails formed on sides thereof,
wherein each of the one or more sliding rails is configured to be paired to a corresponding one of the one or more grooves to have the amplifying module unit to slide into the second section.

18. The apparatus of claim 14, wherein the amplifying module unit further comprises one or more sliding rails formed on sides thereof, and the second section of the case further comprises one or more grooves on sides thereof,
wherein each of the one or more sliding rails is configured to be paired to a corresponding one of the one or more grooves to have the amplifying module unit to slide into the second section.

* * * * *